US011059941B2

(12) United States Patent
Zhou et al.

(10) Patent No.: US 11,059,941 B2
(45) Date of Patent: Jul. 13, 2021

(54) METHODS FOR PREPARING MATERIALS FROM POLYAROMATIC HEAVY FEEDSTOCKS

(71) Applicant: ExxonMobil Research and Engineering Company, Annandale, NJ (US)

(72) Inventors: Huaxing Zhou, Warwick, PA (US); Arnold Lustiger, Edison, NJ (US); Victor DeFlorio, Newton, NJ (US); Srinivasan Rajagopalan, Easton, PA (US); Timothy D. Shaffer, Plainfield, NJ (US); Donald N. Schulz, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 16/362,984

(22) Filed: Mar. 25, 2019

(65) Prior Publication Data

US 2019/0315912 A1    Oct. 17, 2019

Related U.S. Application Data

(60) Provisional application No. 62/656,506, filed on Apr. 12, 2018.

(51) Int. Cl.
| | |
|---|---|
| *C08G 61/10* | (2006.01) |
| *C08G 61/12* | (2006.01) |
| *C10G 11/02* | (2006.01) |

(52) U.S. Cl.
CPC ........... *C08G 61/10* (2013.01); *C08G 61/126* (2013.01); *C10G 11/02* (2013.01);
(Continued)

(58) Field of Classification Search
CPC ..... C09J 5/02; C09J 5/04; C09J 175/04; C09J 183/08; C09J 2301/50; C09J 2203/00;
(Continued)

(56) References Cited

U.S. PATENT DOCUMENTS

| | | |
|---|---|---|
| 3,810,857 A | 5/1974 | Garrigues et al. |
| 4,337,193 A | 6/1982 | Szita |

(Continued)

FOREIGN PATENT DOCUMENTS

| | | |
|---|---|---|
| CN | 102675886 B | 5/2014 |
| GB | 1327417 A | 8/1973 |

OTHER PUBLICATIONS

Karger-Kocsis, et al, "Ground Tyre Rubber (GTR) in Thermoplastics, Thermosets, and Rubbers", Springer Science and Business Media LLC, 2012, vol. 48, pp. 1-38.

(Continued)

*Primary Examiner* — Shane Fang
(74) *Attorney, Agent, or Firm* — Kristina Okafor; Hsin Lin

(57) ABSTRACT

The present disclosure relates to methods for preparing materials from heavy feedstocks. In particular, the disclosure provides a chemical process to convert heavy feedstocks with predominant polyaromatic hydrocarbon molecules or species, including the residues of petrochemical refining or extraction, into thermoset or thermoplastic materials that can be used alone or as a component in a composite material.

13 Claims, 5 Drawing Sheets

(52) U.S. Cl.
CPC . *C08G 2261/146* (2013.01); *C08G 2261/148* (2013.01); *C08G 2261/1414* (2013.01); *C08G 2261/1422* (2013.01); *C08G 2261/1428* (2013.01); *C08G 2261/1452* (2013.01); *C08G 2261/228* (2013.01); *C10G 2300/1044* (2013.01); *C10G 2300/44* (2013.01)

(58) Field of Classification Search
CPC ............. C09J 2400/146; C09J 2400/20; C09J 2483/003; B32B 17/06; B32B 7/12; B32B 37/1284; B32B 2315/08; B32B 2605/00; C03C 17/30; C03C 27/048; C03C 27/10; C08G 18/3876; C08G 77/26
See application file for complete search history.

(56) References Cited

U.S. PATENT DOCUMENTS

| | | |
|---|---|---|
| 2003/0171460 A1 | 9/2003 | Rached et al. |
| 2007/0112102 A1 | 5/2007 | Kluttz et al. |
| 2012/0123028 A1 | 5/2012 | Dreesen et al. |
| 2016/0039957 A1* | 2/2016 | Al-Malki ................ B01J 19/24 |
| | | 526/256 |

OTHER PUBLICATIONS

Navarro et al, "Bitumen Modification With a Low-Molecular-Weight Reactive Isocyanate-Terminated Polymer", Elsevier Ltd, 2007, vol. 86, pp. 2291-2299.
The International Search Report and Written Opinion for PCT/US2019/023818 dated Jul. 3, 2019.

* cited by examiner

METHODS FOR PREPARING MATERIALS FROM POLYAROMATIC HEAVY FEEDSTOCKS

CROSS-REFERENCE TO RELATED APPLICATIONS

This application claims priority to U.S. Provisional Application No. 62/656,506 filed Apr. 12, 2018, which is herein incorporated by reference in its entirety.

FIELD

The present disclosure relates to methods for preparing materials from aromatic hydrocarbon and hetero aromatic feedstocks. In particular, the disclosure provides a chemical process to convert heavy feedstocks with predominant polyaromatic hydrocarbon molecules or species, including the residues of petrochemical refining or extraction, into thermoset or thermoplastic materials that can be used alone or as a component in a composite material.

BACKGROUND

In the oil and gas industry, crude oil or gases are separated or converted via various chemical processes into useful petroleum products. The desired products are various types of fuels, lubes and other petroleum chemicals, for example, ethylene, propylene, benzene, toluene, xylenes etc.

However, the heavy molecules in the crude oil or the complex molecules generated during petrochemical processes are generally of low value and tend to have a higher carbon to hydrogen ratio. Such complex residues may also contain a high heteroatom content.

Over the past several decades, various chemical processes have been developed to further process such heavy feedstocks. The most common ones include different coking processes, in which the heavy feedstocks under high temperature would dealkylate to form lighter molecules and in certain cases, polymerize and dehydrogenate into extremely heavy carbon soot. In other processes, these heavy feedstocks are hydrotreated and then cracked into smaller molecules that can have intrinsic fuel value, depending upon the degree of hydrogenation and cracking. However, such processes are usually energy-intensive, and value creation becomes increasingly marginal, while still leaving the issue of identifying possible residual value from the residual coke or related product(s).

There are processes in further modifying heavy feedstocks for various applications. For example, there have been studies in bitumen industry on the various ways to modify bitumen type of materials as binders for road paving materials to improve the deformation resistance, cracking resistance properties. These methods include blending polymers (e.g. SBS, EPDM, PE, PVC etc.), adding acids (e.g. polyphosphoric acid), grafting alkyl chains, sulphonation, oxidation (e.g. blowing air) and combination of multiple methods. There are reports of using crosslinking reactions for bitumen modification. However, those reactions normally require additions of one or more polymer or block copolymer (see, e.g., US20120123028A1; WO2007/058994) into the bitumen, and do not lead to a product that can be used to replace commonly used thermosets or thermoplastics materials.

Thermoset materials are used in many industries, such as automotive/aircraft, wood processing, building construction, mechanical engineering, equipment manufacturing, abrasives, foundry components, steel, paint, adhesives, as well as the electrical industry. The commonly used thermoset materials include phenolics, epoxies, urea resins, melamine, furan, and unsaturated polyester resins, as well as thermosetting polyurethane, acrylate, and silicone resins. However, current thermoset materials are relatively expensive compared to thermoplastic commodity materials and construction materials such as cement and wood.

It is therefore advantageous to have alternative ways to efficiently process heavy feedstocks, and to convert them into thermoset materials that can be used alone or as a component in a composite material.

SUMMARY

The present disclosure relates to novel methods for preparing materials from heavy feedstocks. In particular, the disclosure provides a chemical process to convert heavy feedstocks with aromatic hydrocarbon molecules or species, including the residues of petrochemical refining or extraction, into thermoset or thermoplastic materials that can be used alone or as a component in a composite material.

Thus, in an aspect, the description provides a method of making thermoplastic or thermoset materials from a heavy feedstock using linker agents, with or without a catalyst. In one embodiment, the heavy feedstock includes at least one selected from vacuum residue, FCC main column bottoms (slurry oil, main column bottoms), steam cracker tar, asphaltenes, C3-C5 rock, bitumen, K-pot bottoms, lube extracts, various streams from refinery processes and other synthetic aromatic hydrocarbons.

In one aspect, the description provides a method of making thermoplastic or thermoset materials from a poly aromatic hydrocarbon feedstock using linker agents, with or without a catalyst.

In one aspect, the description provides a method of making thermoplastic or thermoset materials from a heavy feedstock using a linker having one of the following general chemical structures.

Type I linker—aromatic molecules.

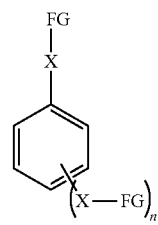

(Formula 1)

FG (functional group) is aldehyde, vinyl, halogen, alcohol, acyl halides, tosylate, mesylate, carboxylic acids, carboxylic anhydrides or a combination thereof;

each X is independently a covalent bond, alkyl, cycloalkyl, or an aryl;

n is an integer in the range of 0 to 5.

In other alternative embodiments, the benzene core of the Type I linker can also be replaced with a polyaromatic core (e.g., naphthalene, pyrene, biphenyl, etc.) or saturated groups.

Type II linker—linker as a pendant group in a polymer chain.

(Formula 2a)

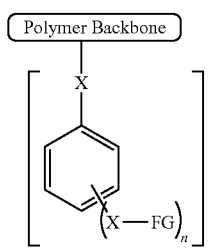

FG (functional group) is aldehyde, vinyl, halogen, alcohol, acyl halides, tosylate, mesylate, carboxylic acids, carboxylic anhydrides or a combination thereof;

each X is independently a covalent bond, alkyl, cycloalkyl, or an aryl;

n is an integer in the range of 1 to 5;

m is an integer in the range of 1 to 10,000;

the polymer backbone has a molecular weight in the range of 1,000 to 1,000,000 g/mol.

In other alternative embodiments, the benzene core of the Type II linker can also be replaced with a polyaromatic core (e.g., naphthalene, pyrene, biphenyl, etc.) or saturated groups.

In another embodiment, the Type II linker has functional groups connected to the polymer chain through a covalent bond, alkyl, or an aryl, with the following structure.

(Formula 2b)

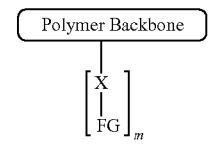

FG (functional group) is aldehyde, vinyl, halogen, alcohol, acyl halides, tosylate, mesylate, carboxylic acids, carboxylic anhydrides or a combination thereof;

X is a covalent bond, alkyl, cycloalkyl, or an aryl;

m is an integer in the range of 1 to 10,000;

the polymer has a molecular weight in the range of 1,000 to 1,000,000 g/mol.

Type III linker—sulfur, including inorganic sulfur and organosulfur compounds that are selected from the group of thiols, organic sulfides, organic disulfides, organic polysulfides, and mixtures thereof.

Type IV linker—dicyclopentadiene with the following structure.

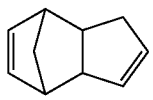

In one aspect, the description provides a method of making thermoplastic or thermoset materials from a heavy feedstock using a linker without a catalyst.

In another aspect, the description provides a method of making thermoplastic or thermoset materials from a heavy feedstock using a linker with a catalyst.

In one embodiment, the catalyst is selected from different kinds of inorganic acids, organic acids, Bronsted acid, or Lewis acids, such as aluminium chloride, hypophosphorous acid, hydrochloric acid, hydrogen iodide, phosphoric acid, methane sulfonic acid, trifluoromethanesulfonic acid, p-toluenesulfonic acid, sulfuric acid, phosphoric acid, polyphosphoric acid, solid acids such as tungstic acid, polyoxometalate acid, and other acids. These acids may be used alone or in combination thereof.

In another embodiment, the catalyst is an acid with the following general structure.

(Formula 3)

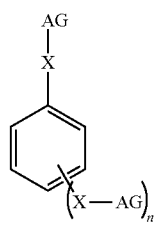

AG (acid group) is phosphoric acid, sulfonic acid, carboxylic acids, or a combination thereof;

each X is independently a covalent bond, alkyl, cycloalkyl, or an aryl;

n is an integer in the range of 0 to 5.

In other alternative embodiments, the benzene core of the catalyst formula 3 can also be replaced with a polyaromatic core (e.g., naphthalene, pyrene, biphenyl, etc.) or saturated groups.

In yet other alternative embodiments, the catalyst and the linker are present on the same polymer backbone. For example, the catalyst contains an acid group (AG) and the linker contains a functional group (FG) with the following structure.

(Formula 4)

Polymer Backbone $$\begin{bmatrix} X_1 \\ | \\ FG \end{bmatrix}_{m_1} \qquad \begin{bmatrix} X_2 \\ | \\ AG \end{bmatrix}_{m_2}$$

FG (functional group) is aldehyde, vinyl, halogen, alcohol, acyl halides, tosylate, mesylate, carboxylic acids, carboxylic anhydrides or a combination thereof;

AG (acid group) is phosphoric acid, sulfonic acid, carboxylic acids, or a combination thereof;

$X_1$ and $X_2$ are independently a covalent bond, alkyl, cycloalkyl, or an aryl;

$m_1$ and $m_2$ are independently an integer in the range of 1 to 10,000;

the polymer has a molecular weight in the range of 1,000 to 1,000,000 g/mol.

In some embodiments, the description provides a method of making thermoplastic or thermoset materials from a heavy feedstock without addition of a solvent.

In some embodiments, the description provides a method of making thermoplastic or thermoset materials from a heavy feedstock with a solvent, such as tetrahydrofuran, or a solvent mixture. In some particular embodiments, the solvent is selected from a group consisting of chlorobenzene, dichlorobenzene, trichlorobenzene, polychlorinated biphenyls, and other halogenated aromatics.

In one aspect, the description provides a thermoplastic or thermoset material produced using the methods described herein.

In another aspect, the description provides a composition containing the material produced from the methods described herein.

Further aspects, features, and advantages of the present disclosure will be apparent to those of ordinary skill in the art upon examining and reading the following Detailed Description of the Preferred Embodiments.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. Further objects, features and advantages of the invention will become apparent from the following detailed description taken in conjunction with the accompanying figures showing illustrative embodiments of the invention, in which.

DETAILED DESCRIPTION

Figure 1:
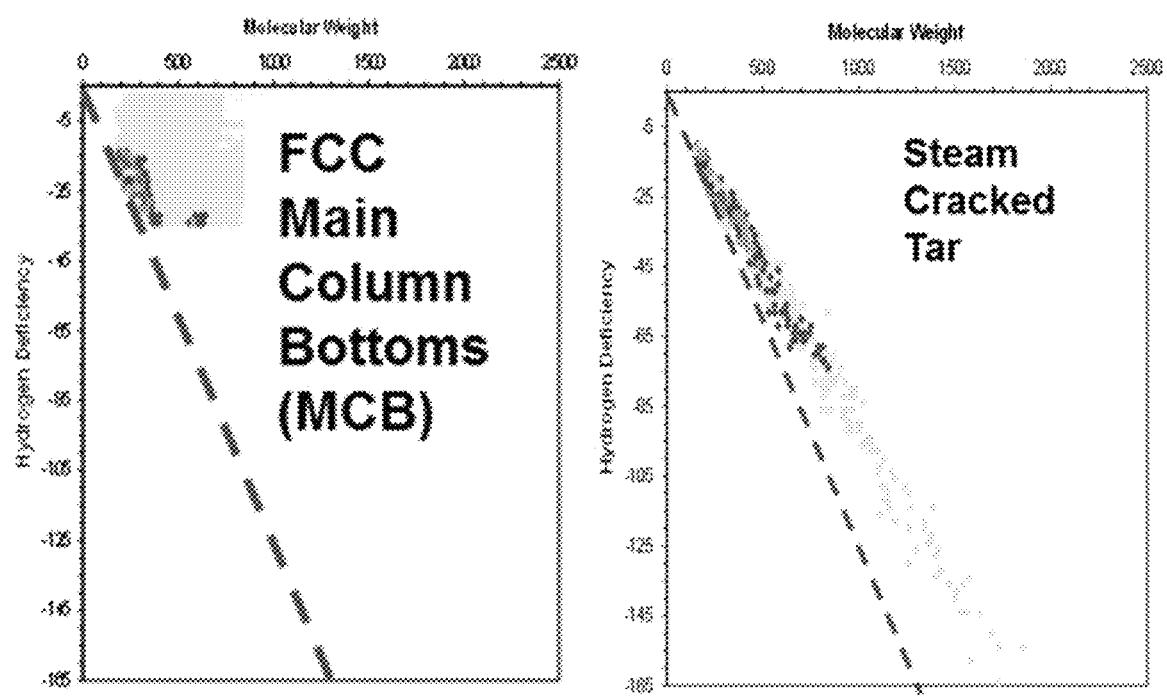
FIG. 1 illustrates a FTICR-MS data of FCC main column bottoms (MCB) and steam cracker tar.

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures and other references mentioned herein are expressly incorporated by reference in their entirety.

The present description provides improved methods for converting heavy feedstocks, including the residues of petrochemical refining or extraction, into thermoset or thermoplastic materials.

Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

The following terms are used to describe the present disclosure. Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

The articles "a" and "an" as used herein and in the appended claims are used herein to refer to one or to more than one (i.e., to at least one) of the grammatical object of the article unless the context clearly indicates otherwise. By way of example. "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims. "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of." or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one. A, and at least one, optionally including more than one, B (and optionally including other elements); etc.

It should also be understood that, in certain methods described herein that include more than one step or act, the order of the steps or acts of the method is not necessarily limited to the order in which the steps or acts of the method are recited unless the context indicates otherwise.

As used herein, the term "heavy feedstock" shall be understood in the broader sense of refinery operations, such as heavy molecules in the crude oil or the complex molecules generated during petrochemical processes, which include poly aromatic hydrocarbons ("PAH") and aromatic hydrocarbons with heteroatoms. The heavy feedstock can be residues of petrochemical refining or to extraction, such as vacuum residue, fluidic catalytic cracking ("FCC") bottoms (slurry oil, main column bottoms ("MCB")), steam cracker tar, asphaltenes, C3-C5 rock, bitumen. K-pot bottoms, lube extracts, various streams from refinery processes and other synthetic aromatic hydrocarbons.

In one exemplary embodiment, the heavy feedstock is FCC bottom, which contains one or a mixture of following molecules:

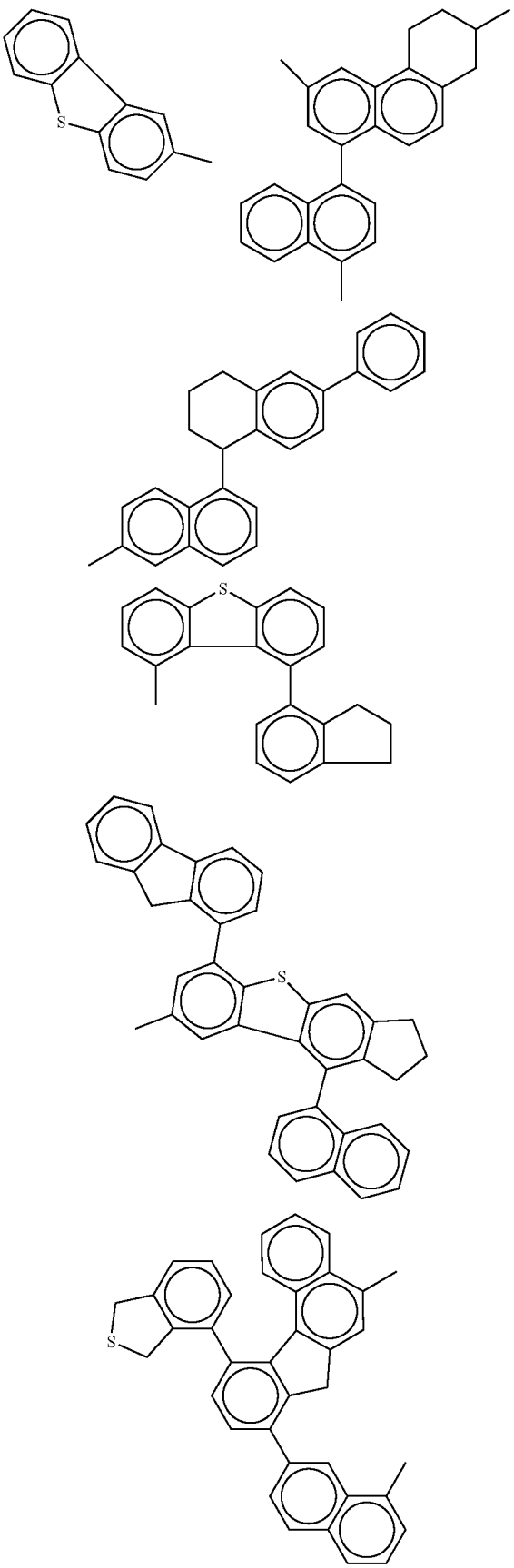

-continued

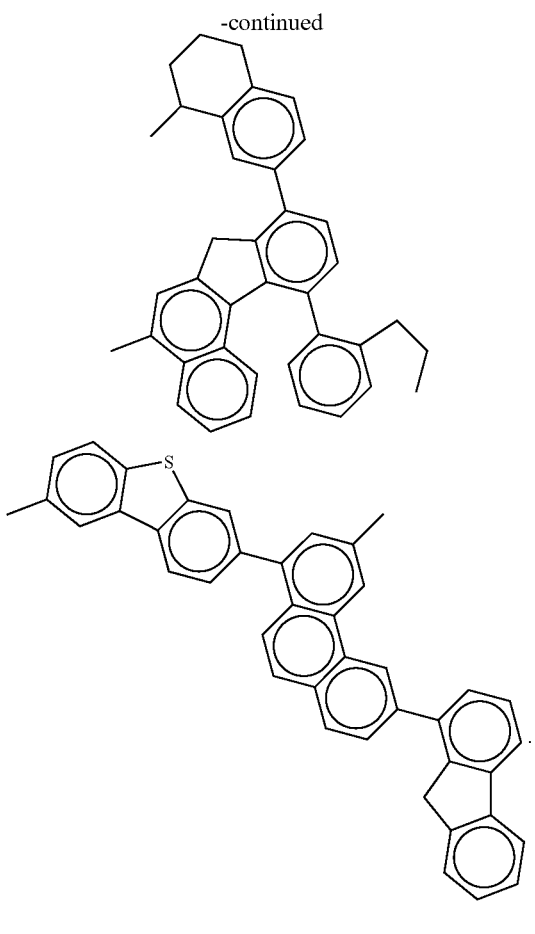

In one aspect, the present disclosure provides methods to link the molecules in the heavy feedstock through the use of a Friedel-Crafts reaction, condensation reaction with formaldehyde (or other aldehydes/ketones), oxidation reaction, sulfur reaction and/or Diels-Alder reactions.

The Friedel-Crafts alkylation (or acylation) involves the alkylation (or acylation) of an aromatic ring with an alkyl (or acyl) halide using an acid catalyst.

The condensation reaction with formaldehyde has been applied in the reaction to form phenolic resin, and can be used to link polyaromatic hydrocarbon molecules in the heavy feedstock.

Oxidation reactions can be used to pretreat aromatic materials and combined with other linking chemistry. Or they can be used to introduce functional groups to the aromatic materials which allows further crosslinking reactions to happen. One non-limiting example of such oxidation reactions is light oxidative coupling reaction via air/oxygen blowing at high temperature. Aromatic hydrocarbons after such treatment have higher molecular weight and higher oxygen content which can accelerate the linking reaction and/or produce materials with better mechanical properties. Aromatic hydrocarbons can also be oxidized under harsh condition, e.g. concentrated $H_2SO_4$ and hydrogen peroxide, to introduce a variety of functional groups, such as epoxy, alcohol, aldehyde or carboxylic acid, which can then be utilized in the linking reaction.

The polymerization reactions of sulfur (including inorganic sulfur and organosulfur compounds that are selected from the group of thiols, organic sulfides, organic disulfides, organic polysulfides, and mixtures thereof) with the aromatic hydrocarbon molecules can be achieved by heating the aromatic hydrocarbons with sulfur.

The Diels-Alder reaction is an organic chemical reaction (specifically, a [4+2] cycloaddition) between a conjugated diene and a substituted alkene, commonly termed the dienophile, to form a substituted cyclohexene derivative. Although simple aromatic molecules are rarely employed as dienes in Diels-Alder reactions, one can connect polyaromatic hydrocarbon molecules through Diels-Alder reactions under certain conditions.

In one aspect, the description provides a method of making thermoplastic or thermoset materials from a poly aromatic hydrocarbon feedstock using linker agents with or without a catalyst.

In one aspect, the description provides a method of making thermoplastic or thermoset materials from a heavy feedstock using a linker or a mixture of linkers having one of the following general chemical structures.

In one aspect, the description provides a method of making thermoplastic or thermoset materials from a heavy feedstock using a Type I linker, and the Type I linker is an aromatic molecule with the following structure.

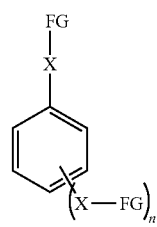

(Formula 1)

FG (functional group) is aldehyde, vinyl, halogen, alcohol, acyl halides, tosylate, mesylate, carboxylic acids, carboxylic anhydrides or a combination thereof;

each X is independently a covalent bond, alkyl, cycloalkyl, or an aryl;

n is an integer in the range of 0 to 5.

In other alternative embodiments, the benzene core of the Type I linker can also be replaced with a polyaromatic core (e.g., naphthalene, pyrene, biphenyl, etc.) or saturated groups.

In one embodiment, the Type I linker includes aromatic/aliphatic molecules with more than one functional group attached, and the functional groups do not need to be the same. In one non-limiting embodiment, the Type I linker is selected from at least one of the following molecules, wherein the two functional groups are at para positions:

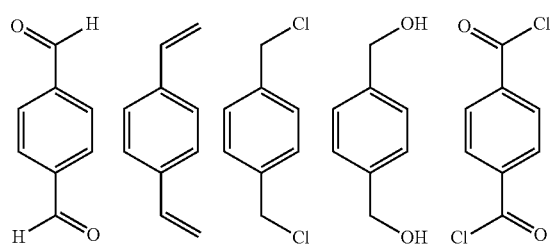

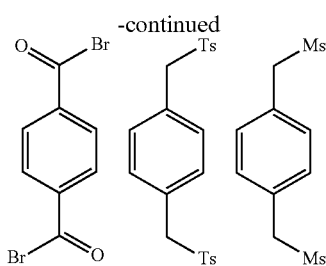

Alternatively, the two functional groups are at ortho- or meta-positions, or attached to naphthalene, pyrene, or biphenyl:

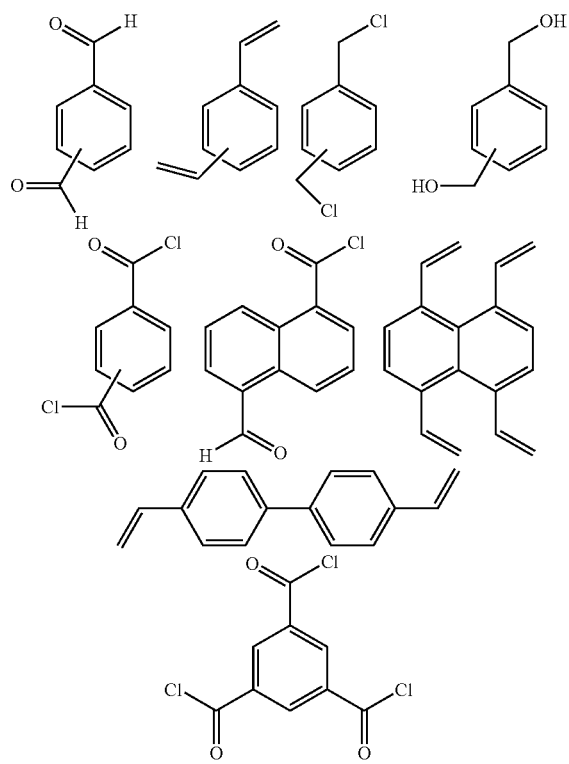

In another aspect, the description provides a method of making thermoplastic or thermoset materials from a heavy feedstock using a polymeric Type II linker, wherein the linker as a pendant group in a polymer chain. In one embodiment, the Type II linker has functional groups connected to the polymer chain through a benzene (formula 2a) or an aromatic molecule.

(Formula 2a)

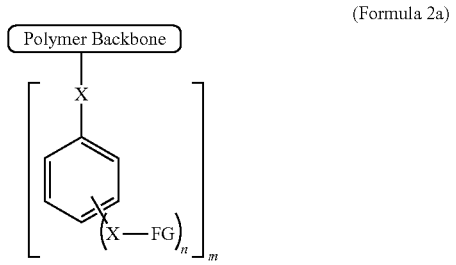

FG (functional group) is aldehyde, vinyl, halogen, alcohol, acyl halides, tosylate, mesylate, carboxylic acids, carboxylic anhydrides or a combination thereof;

each X is independently a covalent bond, alkyl, cycloalkyl, or an aryl;

n is an integer in the range of 1 to 5;

m is an integer in the range of 1 to 10,000;

the polymer backbone has a molecular weight in the range of 1,000 to 1,000,000 g/mol.

In other alternative embodiments, the benzene core of the formula 2a can also be replaced with a polyaromatic core (e.g., naphthalene, pyrene, biphenyl, etc.) or saturated groups.

In another embodiment, the Type II linker has functional groups connected to the polymer chain through a covalent bond, alkyl, or an aryl, with the following structure.

(Formula 2b)

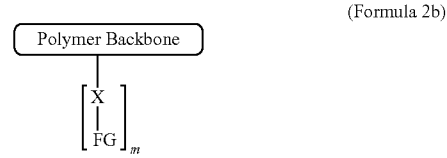

FG (functional group) is aldehyde, vinyl, halogen, alcohol, acyl halides, tosylate, mesylate, carboxylic acids, carboxylic anhydrides or a combination thereof;

X is a covalent bond, alkyl, cycloalkyl, or an aryl;

m is an integer in the range of 2 to 10,000;

the polymer backbone has a molecular weight in the range of 1,000 to 1,000,000 g/mol.

In certain embodiments, the Type II linker is of the structure:

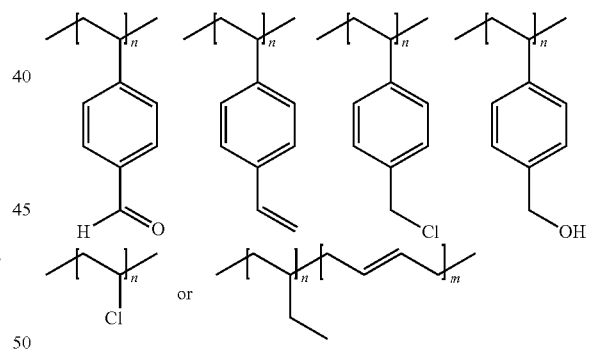

In another aspect, the description provides a method of making a thermoplastic or thermoset materials from a heavy feedstock using a sulfur Type III linker.

In another aspect, the description provides a method of making a thermoplastic or thermoset materials from a heavy feedstock using a diene Type IV linker—dicyclopentadiene with the following structure.

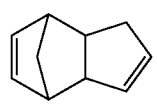

wherein the diene is capable of linking the molecules in the heavy feedstock through Friedel-Crafts reaction.

In some embodiments, the linker is in the amount of 0.1% to 100% w/w of the total weight of the heavy feedstock. In some particular embodiments, the linker is in the amount of about 20% to about 100% w/w of the total weight of the heavy feedstock. For example, the linker may be present in about 20% to about 90%, about 20% to about 80%, about 20% to about 70%, about 20% to about 65%, about 20% to about 50%, about 20% to about 40%, about 20% to about 30%, about 30% to about 90%, about 30% to about 80%, about 30% to about 70%, about 30% to about 60%, about 30% to about 50%, about 30% to about 40%, about 40% to about 90%, about 40% to about 80%, about 40% to about 70%, about 40% to about 60%, about 40% to about 50%, about 50% to about 90%, about 50% to about 80%, about 50% to about 70%, about 50% to about 60%, about 60% to about 90%, about 60% to about 80%, about 60% to about 70%, about 70% to about 90%, about 70%0 to about 80%, about 80% to about 90% w/w of the total weight of the heavy feedstock.

In one aspect, the description provides a method of making a thermoplastic or thermoset materials from a heavy feedstock using a linker without a catalyst.

In another aspect, the description provides a method of making a thermoplastic or thermoset materials from a heavy feedstock using a linker with a catalyst.

In one embodiment, the catalyst is selected from different kinds of inorganic acids, organic acids or Lewis acids, such as aluminium chloride, trifluoromethanesulfonic acid, p-toluenesulfonic acid, sulfuric acid, phosphoric acid, polyphosphoric acid, solid acids such as tungstic acid a polyoxometalate and other acids with the following structures. These acids may be used alone or in combination thereof.

In another embodiment, the catalyst is an acid with the following general structure.

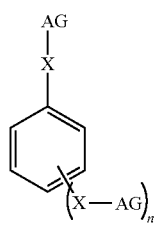

(Formula 3)

AG (acid group) is a phosphoric acid, sulfonic acid, carboxylic acids, methanesulfonic acid, p-toluenesulfonic acid, or a combination thereof;

each X is independently a covalent bond, alkyl, cycloalkyl, or an aryl;

n is an integer in the range of 0 to 5.

In other alternative embodiments, the benzene core of the catalyst formula 3 can also be replaced with a polyaromatic core (e.g., naphthalene, pyrene, biphenyl, etc.) or saturated groups.

Examples of catalyst include:

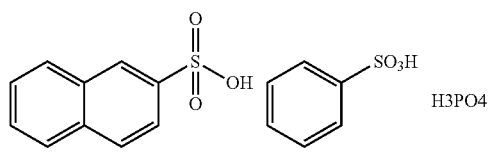

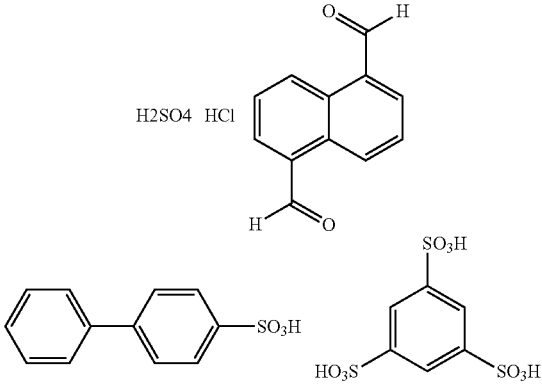

In some embodiments, the catalyst is in the amount of 0.1% to 50% w/w of the total weight of the linker and the heavy feedstock. In some particular embodiments, the catalyst is in the amount of about 0.1% to about 40% w/w of the total weight of the linker and the heavy feedstock. For example, the catalyst may be present in about 0.1% to about 40%, about 0.1% to about 30%, about 0.1% to about 20%, about 0.1% to about 10%, about 0.5% to about 40%, about 0.5% to about 30%, about 0.5% to about 20%, about 0.5% to about 10%, about 1% to about 40%, about 1% to about 30%, about 1% to about 20%, about 1% to about 10% w/w of the total weight of the linker and the heavy feedstock.

In yet other alternative embodiments, the catalyst and the linker are present on the same polymer backbone. For example, the catalyst contains an acid group (AG) and the linker contains a functional group (FG) with the following structure.

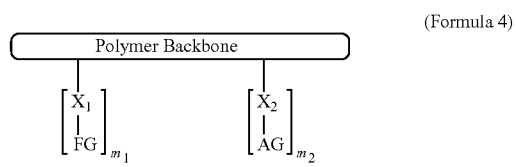

(Formula 4)

FG (functional group) is aldehyde, vinyl, halogen, alcohol, acyl halides, tosylate, mesylate, carboxylic acids, carboxylic anhydrides or a combination thereof;

AG (acid group) is phosphoric acid, sulfonic acid, carboxylic acids, or a combination thereof;

$X_1$ and $X_2$ are independently a covalent bond, alkyl, cycloalkyl, or an aryl;

$m_1$ and $m_2$ are independently an integer in the range of 1 to 10,000;

the polymer has a molecular weight in the range of 1,000 to 1.000,000 g/mol.

The acid group and the functional group may choose from any of the examples described above.

In some embodiment, the description provides a method of making thermoplastic or thermoset materials from a heavy feedstock without addition of a solvent.

In some embodiment, the description provides a method of making thermoplastic or thermoset materials from a heavy feedstock with a solvent. In some particular embodiment, the solvent is selected from a group consisting of chlorobenzene, dichlorobenzene, trichlorobenzene, other halogenated aromatics.

In one aspect, the description provides a thermoplastic or thermoset material produced using the methods described herein.

In another aspect, the description provides a composition containing the material produced from the methods described herein.

EXAMPLES

The embodiments described above in addition to other embodiments can be further understood with reference to the following examples:

Heavy Feedstock Content Testing

Fourier-transform ion cyclotron resonance mass spectrometry ("FTICR-MS") is used to determine the mass-to-charge ratio (m/z) of ions based on the cyclotron frequency of the ions in a fixed magnetic field. The FTICR-MS data obtained in the FIGS. 1-3 was generated using the following method:

Sample

| | |
|---|---|
| concentration | 50 ppm in toluene |
| Syringe flow rate | 1.20 uL/h |
| Ionization method | APPI(+) (positive mode Atmospheric Pressure Photoionization) |
| Scans averaged | 200 |
| Mass range | 150-2000 m/z |
| Ion accumulation time | 0.05 s |
| Calibration | Internal, using a homologous series differing by CH$_2$ units |

The FTICR-MS data of FCC main column bottoms (MCB) and steam cracked tar are listed in FIG. 1. Both MCB and SCT show substantial hydrogen deficiency (aromaticity). Thus both feedstocks are appropriate for the linking chemistries of the instant invention. Although SCT shows a higher hydrogen deficiency (higher aromaticity) than MCB.

Heavy Feedstocks Under Friedel-Craft Conditions

Different heavy feedstocks were tested under Friedel-Craft conditions using the following general reaction scheme:

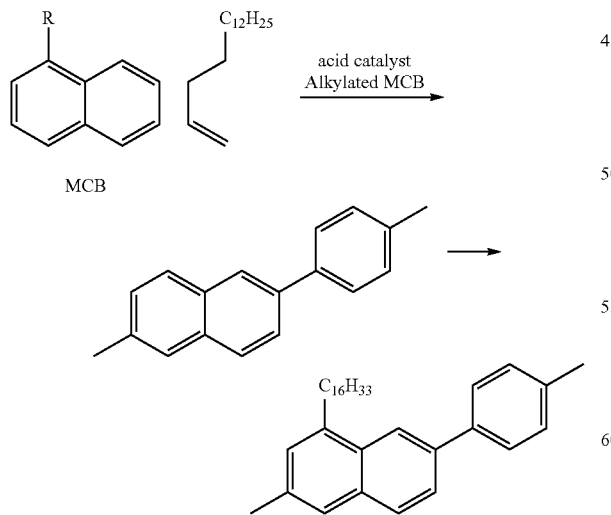

MCB

A typical synthesis procedure is described below:
1. In ajar, added MCB 10 g, linkers 10 g, and the reaction mixture was stirred until fully mixed;
2. Acid catalyst p-toluenesulfonic acid 60 mg was added and the mixture was heated to 60° C. to facilitate the mixing;
3. Raised the reaction temperature to 130° C., and maintained for 5 hours;
4. The reaction mixture was collected for FTICR-MS testing.

Figure 2A:
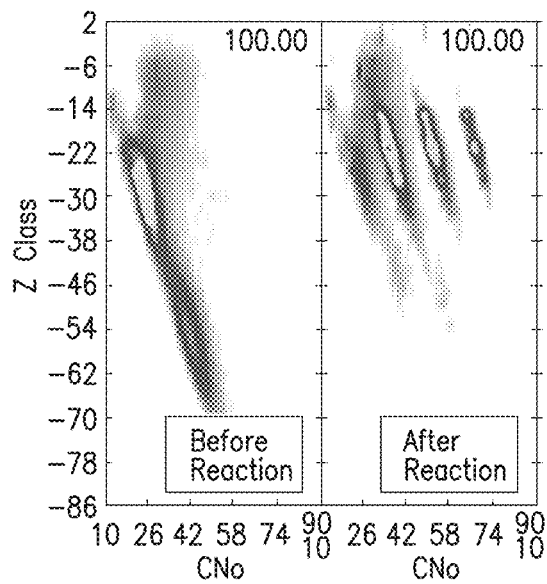
FIGS. 2a, 2b, and 2c illustrate FTICR-MS data before and after the reaction using MCB as a polyaromatic feedstock starting material and a mono functional vinyl molecule as a linker: (a) compositional maps of all species, (b) compositional maps of 1S species; and (c) compositional maps of 1N species.
Figure 2B:
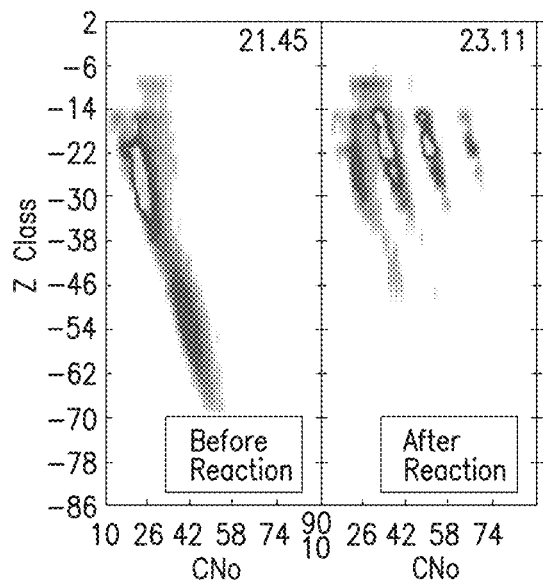
Figure 2C:
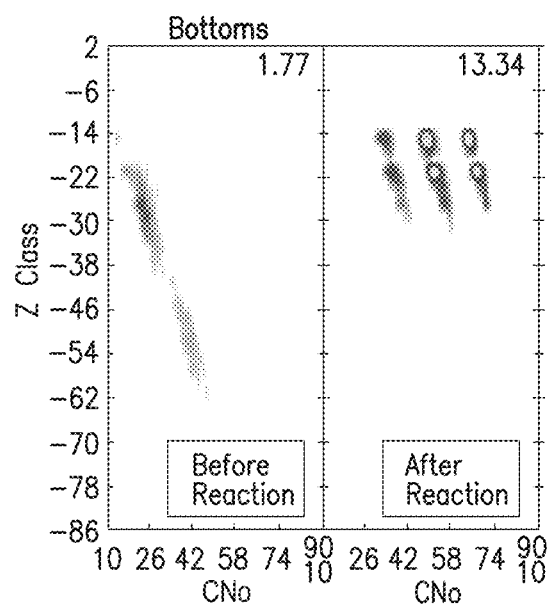

The FTICR-MS data before and after the Friedel-Craft reaction using MCB as a starting material is shown in FIGS. 2a, 2b, and 2c. According to FTICR-MS data, over 90% of MCB molecules are converted to higher molecular weight species after the Friedel-Craft reaction, and the results also suggest that highly polyaromatic species are more susceptible to Friedel-Craft reaction.

Figure 3A:
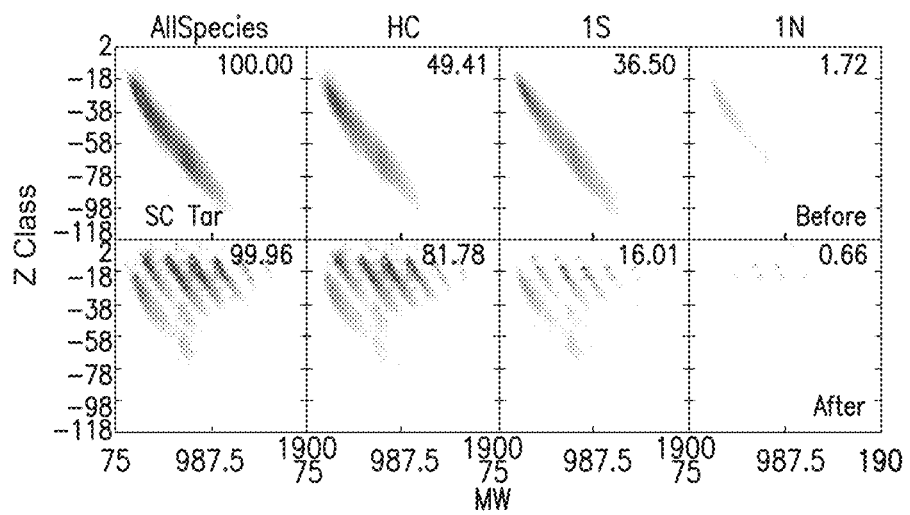
FIGS. 3a, 3b, and 3c illustrate FTICR-MS data before and after the reaction using (a) vacuum residue, (b) steam cracker tar, and (c) AR 200 as heavy feedstock starting material and a mono functional vinyl molecule as a linker.
Figure 3B:
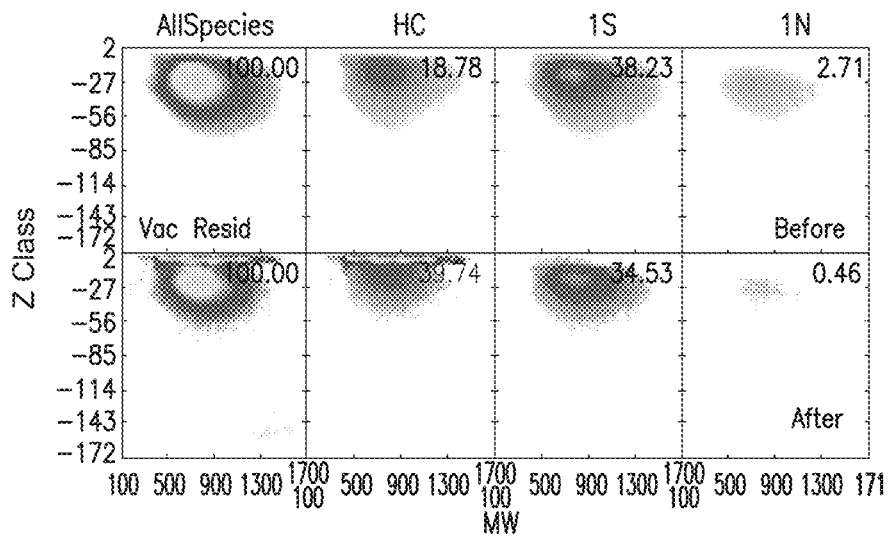
Figure 3C:
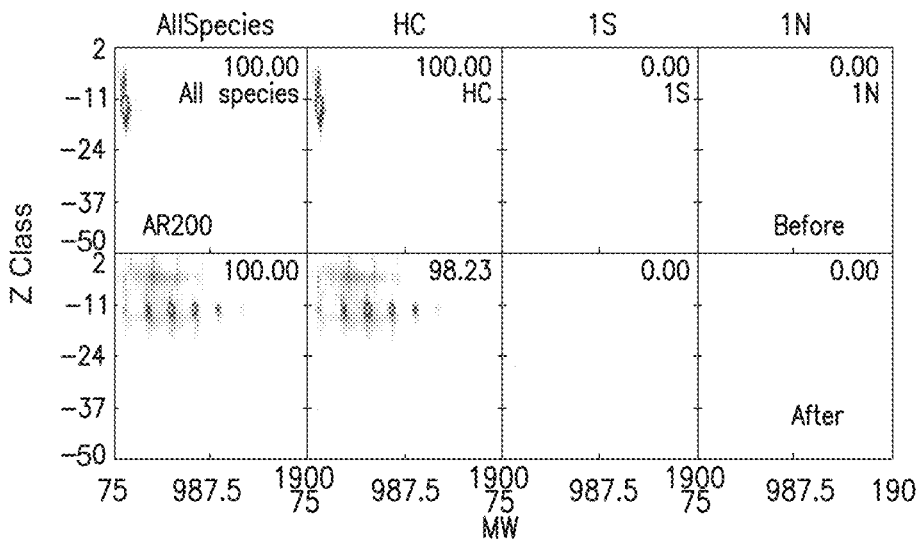

Additional experiments using vacuum residue, AR 200, and steam cracker tar as starting materials are also conducted to test the suitability of different aromatic heavy feedstock for direct Friedel-Craft reaction, and the FTICR-MS data are shown in FIGS. 3a, 3b, and 3c. The results indicated that Friedel-Craft reaction is effective in increasing the molecular weight of molecules in the heavy feedstock.

Effect of Different Linkers Under Friedel-Craft Conditions and their Applications The effect of linkers was evaluated using AR 200 as the heavy feedstock starting material under the following experimental procedure:
1. In ajar, added AR200 10 g, linkers 10 g, and the reaction mixture was stirred until fully mixed;
2. Acid catalyst p-toluenesulfonic acid 60 mg was added and the mixture was heated to 60° C. to facilitate the mixing;
3. Raised the reaction temperature to 130° C., and maintained for 5 hours;
4. The viscous reaction mixture was poured into a mold and further cured the mixture in the mold overnight at 110° C.

Different linkers were evaluated, and structures of the linkers are listed below:

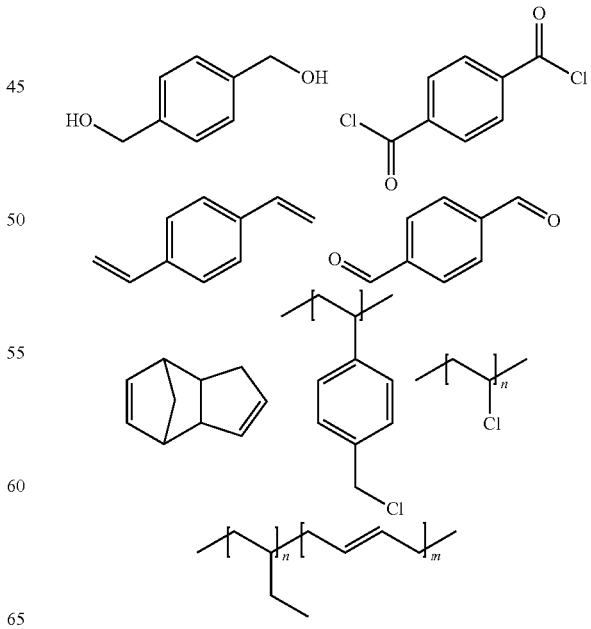

The tensile properties of the cured products were measured using an Instron 5565 tensile tester, in which a specimen of a standard shape and dimensions prepared according to ASTM D 638: standard test method for tensile properties of plastics.

Figure 4:
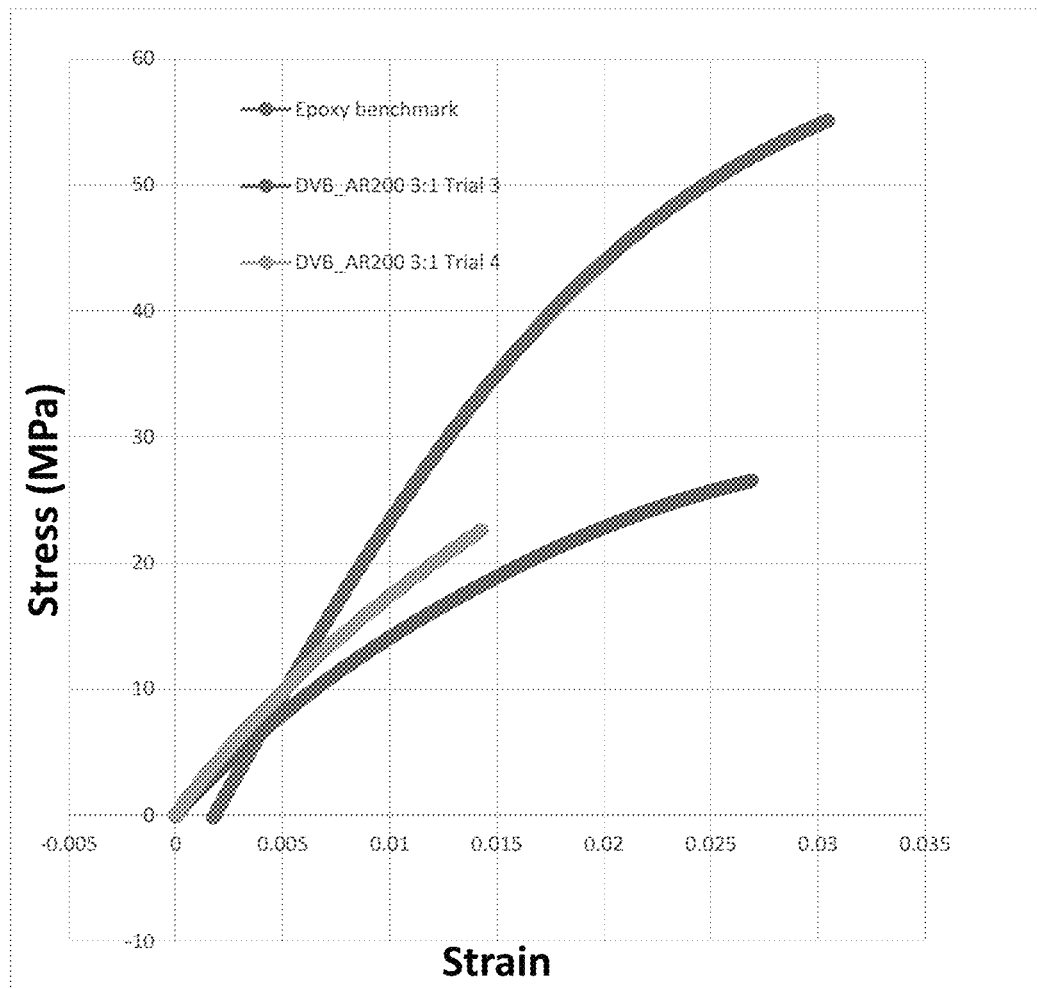
FIG. 4 illustrates tensile properties of Epoxy and cure product from a AR 200 heavy feedstock starting material and para-divinylbenzene ("DVB") linker, the reaction produced a thermoset material.

When the linker is para-divinylbenzene ("DVB"), a Type I linker, the reaction produced a thermoset material that is rigid. And the stain-stress curves of different trials are compared with the commercially available Epoxy materials, as shown in FIG. 4, and Table 1 below.

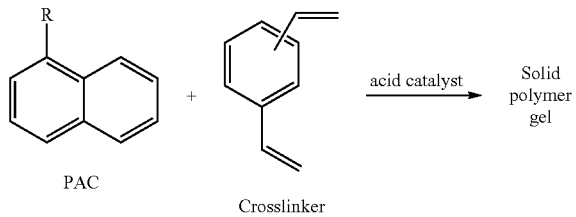

PAC  
Crosslinker

The effect of different heavy aromatics was evaluated using MCB as the heavy feedstock starting materials under the following experimental procedure:
1. In ajar, added MCB 10 g, linkers 10 g, and the reaction mixture was stirred until fully mixed;
2. Acid catalyst p-toluenesulfonic acid 60 mg was added and the mixture was heated to 60° C. to facilitate the mixing;
3. Raised the reaction temperature to 130° C., and maintained for 5 hours;
4. The viscous reaction mixture was poured into a mold and further cured the mixture in the mold overnight at 110° C.

The reaction between MCB and DVB linker produced a thermoset material that was rigid. The strain-stress curve of MCB-DVB is also compared with the commercial available Epoxy materials, as shown in Table 1 below.

TABLE 1

Tensile properties of the cured product using AR 200 and MCB heavy feedstocks with different molar ratios of DVB linker and commercial available Epoxy materials.

| | Molar ratio | Modulus (Mpa) | Std | Maximum stress (Mpa) | Std | Strain at failure (%) | Std |
|---|---|---|---|---|---|---|---|
| DVB:AR200 trial 1 | 3:1 | 2788 | 373 | 38 | 2 | 1.47 | 0.04 |
| DVB:AR200 trial 2 | 3:1 | 2578 | 174 | 31 | 6 | 1.3 | 0.3 |
| DVB:AR200 trial 3 | 3:1 | 2454 | 151 | 33 | 5 | 1.5 | 0.2 |
| DVB:AR200 trial 4 | 3:1 | 1888 | 196 | 41 | 14 | 2.0 | 0.7 |
| DVB:AR200 trial 1 | 4:1 | 2830 | 10 | 38 | 8 | 1.5 | 10.4 |
| DVB:MCB trial 1 | 3:1 | 3072 | 59 | 13 | 1 | 0.45 | 0.05 |
| Epoxy benchmark | | 3000 | — | 50 | — | 3 | — |

Figure 5:
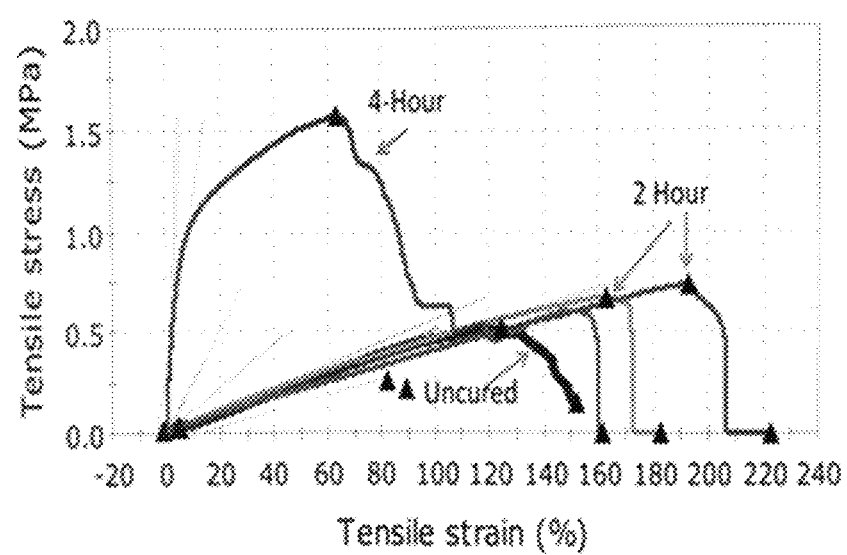
FIG. 5 illustrates tensile properties from strain-stress curve of Epoxy and cure product from a AR 200 heavy feedstock starting material and polyvinylchloride linker, the reaction produced a thermoplastic material that is elastomeric with low stiffness.

In contrast, when the linker is polyvinylchloride, a Type II linker, the reaction produced a thermoplastic material that was elastomeric with low stiffness. And the strain-stress curve is shown in FIG. 5, and Table 2 below. Note that the initial result indicated that the curing time would also impact the tensile properties

TABLE 2

Tensile properties of the cured product using AR 200 heavy feedstock with polyvinylchloride linker.

| | E (GPa) | s (MPa) | $e_f$ (%) |
|---|---|---|---|
| Uncured | 6E-4 | 0.5 | 120 |
| 2-hr cure | 6E-4 | 0.5-0.7 | 180 |
| 4-hr cure | 0.05 | 1.5 | 100? |

The contents of all references, patents, pending patent applications and published to patents, cited throughout this application are hereby expressly incorporated by reference.

Those skilled in the art will recognize, or be able to ascertain using no more than routine experimentation, many equivalents to the specific embodiments of the present disclosure described herein. Such equivalents are intended to be encompassed by the following claims. It is understood that the detailed examples and embodiments described herein are given by way of example for illustrative purposes only, and are in no way considered to be limiting to the invention. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the present disclosure. Such equivalents are intended to be encompassed by the following claims.

EXEMPLARY EMBODIMENTS

1. A method of making a thermoplastic or thermoset material from a heavy feedstock comprising the steps of:

contacting a linker agent and a catalyst with the heavy feedstock;

reacting the linker agent with molecules in the heavy feedstock under mixing to form a reaction mixture; and
curing the reaction mixture to form a thermoplastic or thermoset material, wherein the linker agent contains at least two functional groups that can react with the molecules in the heavy feedstock.

2. The method according to claim 1, wherein the linker has the structure of Formula 1:

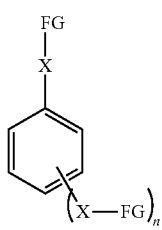

(Formula 1)

wherein FG (functional group) is aldehyde, vinyl, halogen, alcohol, acyl halides, tosylate, mesylate, carboxylic acids, carboxylic anhydrides or a combination thereof, each X is independently a covalent bond, alkyl, cycloalkyl, or an aryl; and n is an integer in the range of 1 to 5.

3. The method according to claim 1, wherein the linker has the structure of Formula 2a:

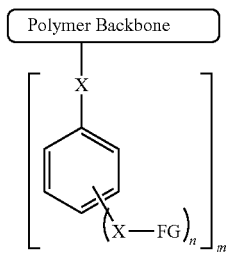

(Formula 2a)

wherein FG (functional group) is aldehyde, vinyl, halogen, alcohol, acyl halides, tosylate, mesylate, carboxylic acids, carboxylic anhydrides or a combination thereof;
each X is independently a covalent bond, alkyl, cycloalkyl, or an aryl;
n is an integer in the range of 1 to 5; and
m is an integer in the range of 2 to 10.000;
the polymer backbone has a molecular weight in the range of 1,000 to 1,000,000 g/mol.

4. The method according to claim 1, wherein the linker has the structure of Formula 2b:

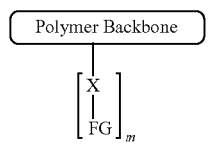

(Formula 2b)

wherein FG (functional group) is aldehyde, vinyl, halogen, alcohol, acyl halides, tosylate, mesylate, carboxylic acids, carboxylic anhydrides or a combination thereof;
X is a covalent bond, alkyl, cycloalkyl, or an aryl;
m is an integer in the range of 2 to 10,000;
the polymer backbone has a molecular weight in the range of 1,000 to 1,000,000 g/mol.

5. The method according to claim 1, wherein the linker is a molecule, or derivatives thereof, with the following structure.

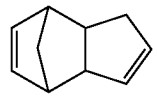

6. The method according to claim 1, wherein the linker is a sulfur or a sulfur compound.

7. The method of claim 1, wherein the catalyst and the linker are present on the same polymer backbone.

8. The method of claim 1, wherein the catalyst contains an acid group (AG) and the linker contains a functional group (FG) with the following structure:

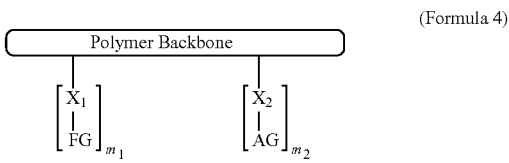

(Formula 4)

wherein FG (functional group) is aldehyde, vinyl, halogen, alcohol, acyl halides, tosylate, mesylate, carboxylic acids, carboxylic anhydrides or a combination thereof; AG (acid group) is phosphoric acid, sulfonic acid, carboxylic acids, or a combination thereof;
$X_1$ and $X_2$ are independently a covalent bond, alkyl, cycloalkyl, or an aryl;
$m_1$ and $m_2$ are independently an integer in the range of 1 to 10,000;
the polymer has a molecular weight in the range of 1,000 to 1,000,000 g/mol.

9. The method according to any of claim 1, wherein the linker contains a diene functional group.

10. The method according to any of claims 1-9, further comprising oxidizing the molecules in the heavy feedstock.

11. The method according to any of claims 1-10, wherein the molecules in the heavy feedstock are oxidized to increase molecular weight or functionality.

12. The method according to any of claims 1-11, wherein the molecules in the heavy feedstock are oxidized under concentrated $H_2SO_4$ and hydrogen peroxide conditions.

13. The method according to any of claims 1-12, wherein the linker contains a naphthalene, a pyrene, or a biphenyl molecule that is connected to more than one functional groups selected from a group consisting of aldehyde, vinyl, halogen, alcohol, acyl halides, tosylate, mesylate, carboxylic acids, carboxylic anhydrides or a combination thereof.

14. The method according to any of claims 1-13, wherein the catalyst is selected from a group consisting of inorganic acids, organic acids, or Lewis acids.

15. The method according to any of claims 1-14, wherein the catalyst is selected from a group consisting of aluminium chloride, trifluoromethanesulfonic acid, p-toluenesulfonic acid, sulfuric acid, phosphoric acid, polyphosphoric acid, solid acids such as tungstic acid a polyoxometalate and other acids with the following structures. These acids may be used alone or in combination thereof.

16. The method according to claim 1, wherein the catalyst is

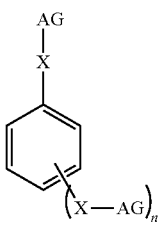

(Formula 3)

wherein AG (acid group) is phosphoric acid, sulfonic acid, carboxylic acids, methanesulfonic acid, p-toluenesulfonic acid, or a combination thereof;
each X is independently a covalent bond, alkyl, cycloalkyl, or an aryl; and
n is an integer in the range of 0 to 5.

17. The method according to any of claims 1-16, wherein the linker is in the amount of 0.1% to 100% w/w of the total weight of the heavy feedstock.

18. The method according to any of claims 1-17, wherein the linker is in the amount of 20% to 80% w/w of the total weight of the heavy feedstock.

19. The method according to any of claims 1-18, wherein the catalyst is in the amount of 0.1% to 10% w/w of the total weight of the linker and the heavy feedstock.

20. The method according to any of claims 1-19, wherein no solvent is used.

21. The method according to any of claims 1-20, wherein a solvent is used and the solvent is selected from a group consisting of chlorobenzene, dichlorobenzene, trichlorobenzene, other halogenated aromatics, or combination thereof.

22. The method according to any of claims 1-21, wherein the linker agent and molecules in the heavy feedstock are reacted at a temperature between room temperature and 400° C.

23. The method according to any of claims 1-22, wherein the linker agent and molecules in the heavy feedstock are reacted at a temperature between 80° C. and 200° C.

24. A thermoset material produced according to claims 1-23.

25. A composition comprising the thermoset or thermoset material produced according to claims 1-23.

EQUIVALENTS

Those skilled in the art will recognize, or be able to ascertain using no more than routine experimentation, many equivalents to the specific embodiments and methods described herein. Such equivalents are intended to be encompassed by the scope of the following claims.

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

The invention claimed is:

1. A method of making a thermoset material from a heavy feedstock comprising polyaromatic hydrocarbon molecules, the method comprising:
contacting a linker agent and a catalyst with the heavy feedstock, a weight of the linker agent comprising 60% w/w or more of a total weight of the heavy feedstock;
reacting the linker agent with molecules in the heavy feedstock under mixing to form a reaction mixture; and
curing the reaction mixture to form a thermoset material,
wherein the catalyst is selected from a group consisting of inorganic acids, organic acids, or Lewis acids, and
wherein the linker agent contains at least two functional groups that can react with the molecules in the heavy feedstock and has the structure of Formula 1:

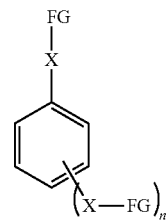

(Formula 1)

wherein FG (functional group) is aldehyde, vinyl, halogen, alcohol, acyl halides, tosylate, mesylate, carboxylic acids, carboxylic anhydrides or a combination thereof;
X is a covalent bond, alkyl, cycloalkyl, or an aryl; and
n is an integer in the range of 1 to 5.

2. The method according to claim 1, wherein the linker contains a diene functional group.

3. The method according to claim 1 further comprising oxidizing the molecules in the heavy feedstock.

4. The method according to claim 3, wherein the molecules in the heavy feedstock are oxidized to increase molecular weight or functionality.

5. The method according to claim 3, wherein the molecules in the heavy feedstock are oxidized under concentrated $H_2SO_4$ and hydrogen peroxide conditions.

6. The method according to claim 1, wherein the linker contains a naphthalene, a pyrene, or a biphenyl molecule that is connected to more than one functional groups selected from a group consisting of aldehyde, vinyl, halogen, alcohol, acyl halides, tosylate, mesylate, carboxylic acids, carboxylic anhydrides or a combination thereof.

7. The method according to claim 1, wherein the catalyst is selected from a group consisting of aluminium chloride, trifluoromethanesulfonic acid, p-toluenesulfonic acid, sulfuric acid, phosphoric acid, polyphosphoric acid, and solid acids.

8. The method according to claim 1, wherein the linker is in the amount of 60% to 80% w/w of the total weight of the heavy feedstock.

9. The method according to claim 1, wherein the catalyst is in the amount of 0.1% to 10% w/w of the total weight of the linker and the heavy feedstock.

10. The method according to claim 1, wherein no solvent is used.

11. The method according to claim 1, wherein a solvent is used and the solvent is selected from a group consisting of chlorobenzene, dichlorobenzene, trichlorobenzene, other halogenated aromatics, or combination thereof.

12. The method according to claim 1, wherein the linker agent and molecules in the heavy feedstock are reacted at a temperature between room temperature and 400° C.

13. The method according to claim 1, wherein the linker agent and molecules in the heavy feedstock are reacted at a temperature between 80° C. and 200° C.

* * * * *